United States Patent [19]

Jaquette

[11] Patent Number: 5,737,371
[45] Date of Patent: Apr. 7, 1998

[54] REALIGNMENT OF DATA STREAM FROM AN OPTICAL DISK

[75] Inventor: Glen Alan Jaquette, Tucson, Ariz.

[73] Assignee: International Business Machines Corporation, Armonk, N.Y.

[21] Appl. No.: 568,238

[22] Filed: Dec. 6, 1995

[51] Int. Cl.$^6$ .............................. G11B 17/22; G11B 3/90
[52] U.S. Cl. ..................... 375/357; 375/373; 369/44.32; 369/48; 369/59; 369/124; 395/439
[58] Field of Search .............................. 375/238, 354, 375/357, 363, 373; 369/124, 59, 44.32, 48; 395/439; 360/39, 41, 51, 53; 370/212, 205, 503, 504, 505, 506, 510, 512, 513, 511, 509

[56] References Cited

U.S. PATENT DOCUMENTS

| Re. 33,665 | 8/1991 | Ogawa | 369/33 |
|---|---|---|---|
| 5,351,231 | 9/1994 | King et al. | 369/124 |
| 5,502,711 | 3/1996 | Clark et al. | 369/124 |
| 5,559,983 | 9/1996 | Masood | 395/439 |
| 5,563,854 | 10/1996 | Kobunaya et al. | 369/32 |

Primary Examiner—Wellington Chin
Assistant Examiner—William Luther
Attorney, Agent, or Firm—D. A. Shifrin

[57] ABSTRACT

An apparatus and method are provided for detecting and correcting data stream misalignments during read back of data in an optical drive unit. In a dual PLL system, after a data stream is divided into separate positive and negative data streams, correlations are made between the transitions in the even nibbles of a sync mark and the transitions in the odd nibbles. Proper and improper alignments can be detected. The resync marks are also employed to determine whether the two data streams are misaligned and, if they are, by how much. While the position of an alignment bit within a resync mark can be detected, realigning the data streams based upon this position can result in small defects causing false alignment and a continuous error until the next resync. Consequently, the present invention employs other bits in the resync mark and in the adjoining customer data field to validate the misalignment independent of the alignment bit itself. Moreover, if a suspected misalignment is not validated by the other bits, information about the misalignment is stored in a memory and the next resync mark is examined. Once any misalignment is validated, a realignment is performed by gating the positive data stream, with an appropriate delay, through a multiplexor to be OR'd with the negative data stream.

6 Claims, 11 Drawing Sheets

FIG. 5A   E 0 0 X 0 1 0 0 0 0 0 0 0 1 0 0 0 0 0 0 1 0 Z 0 0 Y
FIG. 5B
FIG. 5C
FIG. 5D
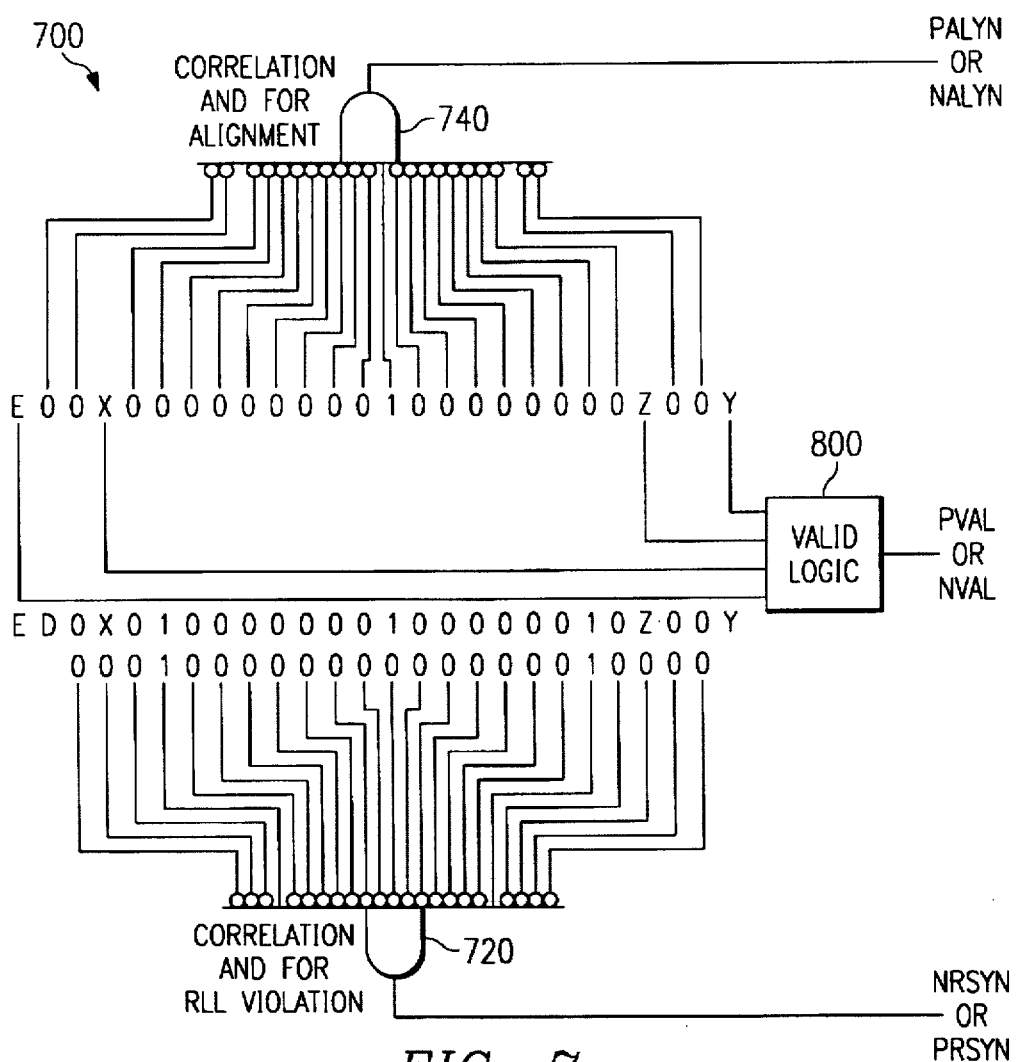
FIG. 7

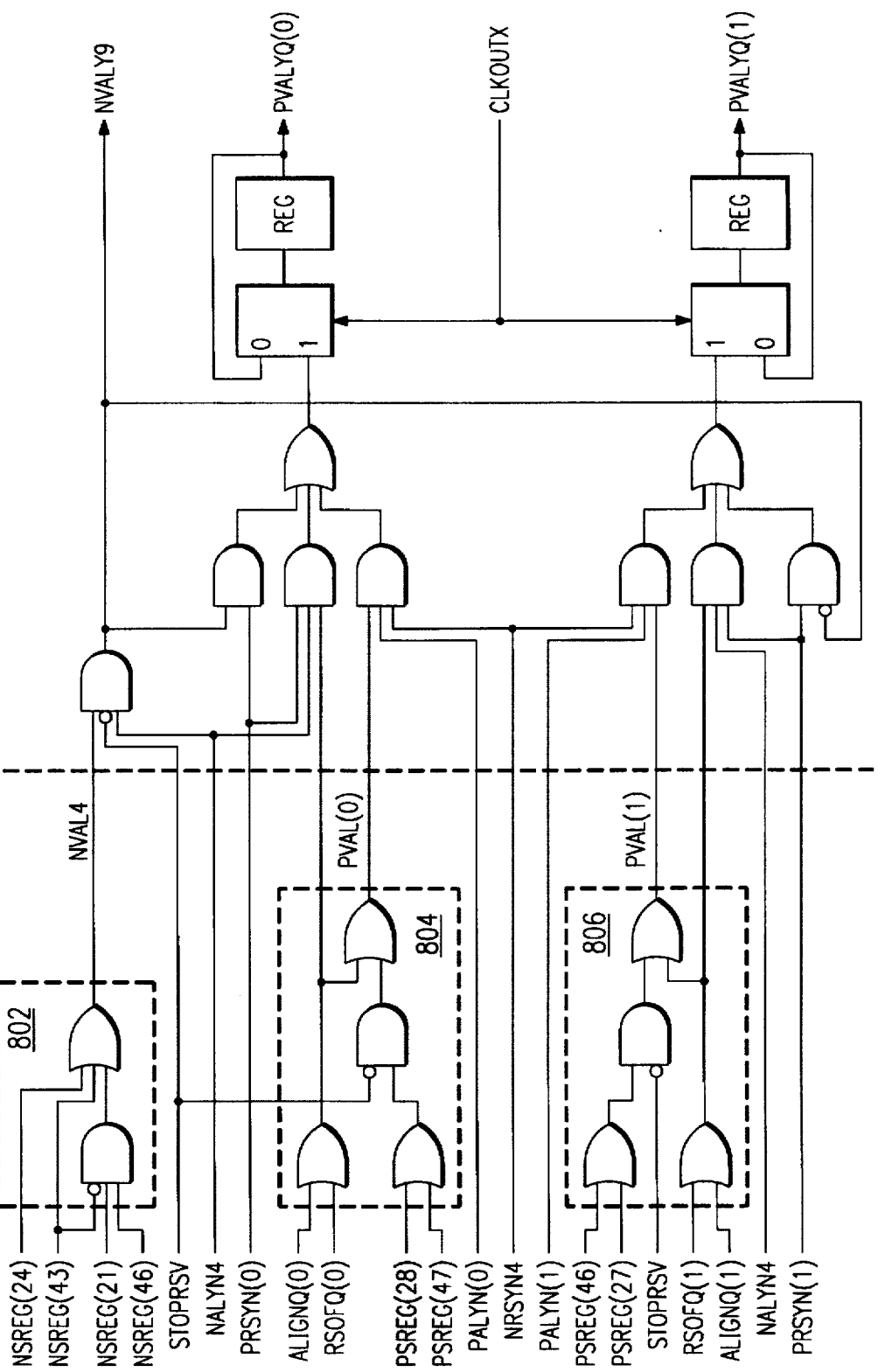

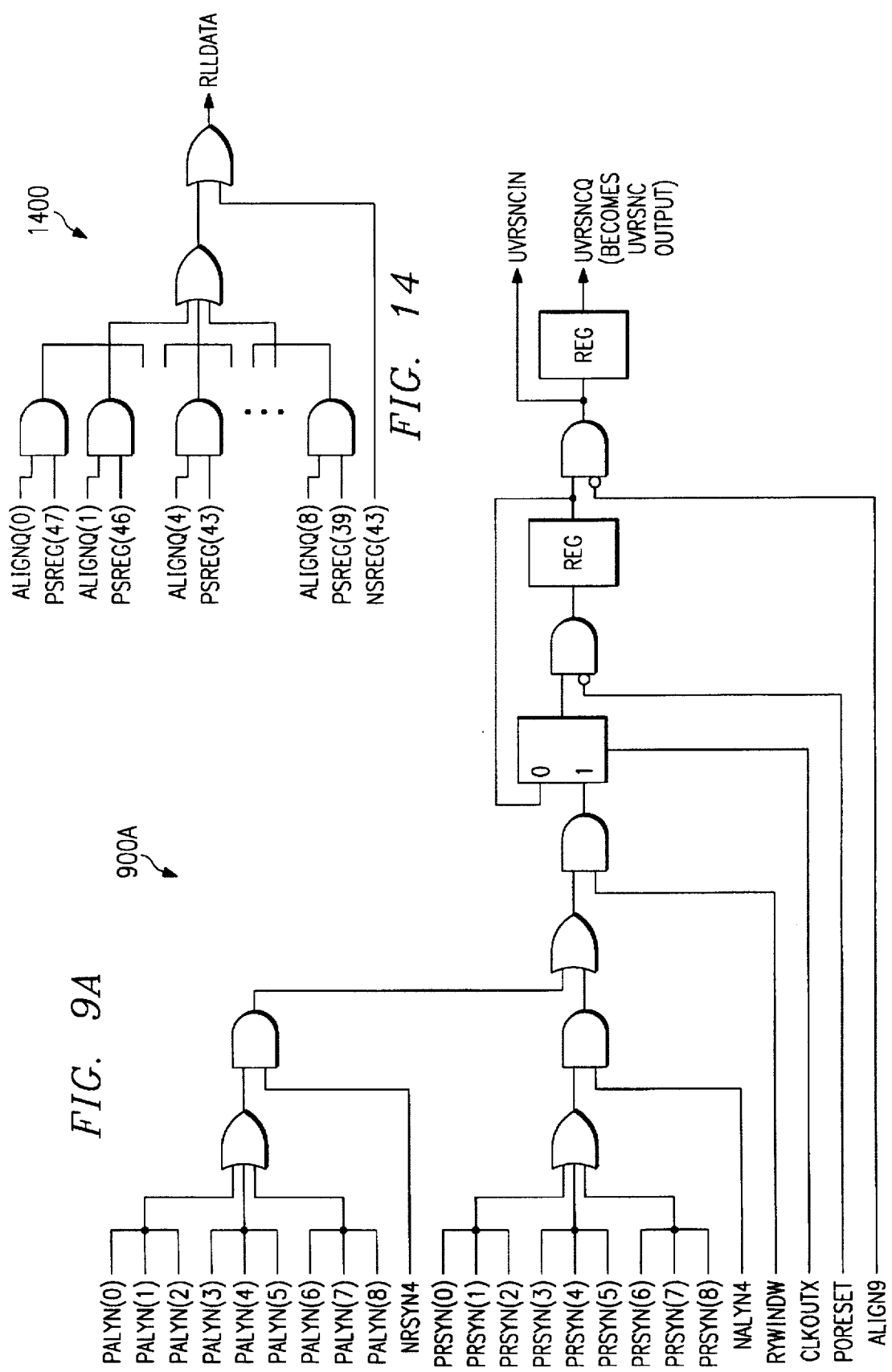

REALIGNMENT OF DATA STREAM FROM AN OPTICAL DISK

RELATED APPLICATION

The present invention is related to co-pending and commonly assigned U.S. application Ser. No. 08/407,124 now U.S. Pat. No. 5,502,711, filed Mar. 20, 1995, entitled "Dual Digital Phase Locked Loop Clock Channel for Optical Recording".

TECHNICAL FIELD OF THE INVENTION

The present invention relates to digital data recording on optical storage media, and in particular, to accurately retrieving and decoding pulse width modulation recorded data from optical media.

BACKGROUND OF THE INVENTION

Pulse width modulation (PWM) recording differs from pulse position modulation (PPM) recording in that a recording signal transition from a low state to a high state in a bit cell timing interval or from a high state to a low state represents a logical 1 (or 0) while the lack of a transition represents a logical 0 (or 1). By contrast, in PPM recording, each bit cell time interval in which the recording signal is in a high state represents a logical 1 (or 0) and each time interval in which the recording signal is in a low state represents a logical 0 (or 1). In PWM recording, it is essential that a detection clock be provided to accurately define the bit cell intervals and that the clock remain synchronized with the recording signal. Moreover, it is both important and difficult to precisely place the leading and trailing edges of a recording mark. Calibrating the power and timing of laser write pulses increases the precision of edge placement; however, variations in media sensitivity, in electronics, in the efficiency of the laser, in the ambient temperature of the media as the drive heats it up after loading, among others, increase the risk of imprecise edge placement, including the risk of recording marks which are consistently longer or shorter than intended.

One method employed to read recorded data is known as dual clock recovery. As described in commonly assigned U.S. Pat. No. 4,734,900 to Davie, a first phase locked loop (PLL) acquires and tracks the leading edges of PWM marks and a second PLL acquires and tracks the trailing edges of the marks. The two resulting data streams are recombined to be decoded. If the two PLL's accurately acquire and track the respective mark edges, the combined data stream will be the actual data. However, if one or both of the PLL's has locked forward or backward onto a poorly written edge, the recombined data stream may be inaccurate, as if the marks were recorded consistently one channel clock time (binit) longer or shorter than the marks were actually recorded. For example, if it is desired to record a 3T mark, a 4T gap, a 5T mark and a 6T gap (see FIG. 1A), the correct single data stream would be: 1001000100001000001. If the PLL's improperly acquire the original data stream, the resulting recombined data stream could be: 1010000100010000001 (as if from a 2T mark, 5T gap, 4T mark and 7T gap; FIG. 1B) if the data is processed as if the marks are longer than actually written, or 1000100100000100001 (as if from a 4T mark, 3T gap, 6T mark and 5T gap; FIG. 1C) if the data is processed as if the marks are shorter than actually written.

A second method employed to read recorded data is known as phase feedback threshold detection (PFTD), described in commonly assigned U.S. Pat. No. 5,204,848. However, if edge detection is based on a threshold which is too high, mark signals are recreated which are one binit too short. And, if edge detection is based on a threshold which is too low, mark signals are recreated which are one binit too long.

With either method, the errors cause a misalignment and decoding the data stream will be continuously in error.

SUMMARY OF THE INVENTION

In view of the foregoing, it is an object of the present invention to sense the proper phasing of the separate data streams output from the PLL's and, by shifting one stream relative to the other, realign the resulting combined data stream to allow accurate decoding and recovery of the recorded data.

This object and others are achieved in this invention by employing both sync marks, written at the end of each VFO3 field, and resync marks, written at fixed intervals in the data field, to verify misalignments in the data stream and to realign the data stream based upon the positions of selected bits in the sync and resync marks. More particularly, in a dual PLL system, after the data stream is divided into separate positive and negative data streams, correlations are made between the transitions in the even nibbles of the sync mark and the transitions in the odd nibbles. If predetermined correlations are made, then no misalignment is present. If, however, other correlations are made between transitions in the even and odd nibbles, a misalignment has occurred. A realignment is performed by gating the positive data stream, with an appropriate delay, through a multiplexor to be OR'd with the negative data stream.

The resync marks are also employed to determine whether the two data streams are misaligned and, if they are, by how much. While the position of an alignment bit within a resync mark can be detected, realigning the data streams based upon this position can result in small defects causing false alignment and a continuous error until the next resync.

Consequently, the present invention employs other bits in the resync mark and in the adjoining customer data field to validate or confirm the misalignment independent of the alignment bit itself. Moreover, if a suspected misalignment is not validated by the other bits, information about the misalignment is stored in a memory and the next resync mark is examined. If the confirmation bits in the original resync mark validate a misalignment, or if the next resync mark confirms the original misalignment, a realignment is performed by gating the positive data stream, with an appropriate delay, through a multiplexor to be OR'd with the negative data stream.

The foregoing and other features and advantages of the invention will be apparent from the following more particular description of preferred embodiments of the invention, as illustrated in the accompanying drawings.

BRIEF DESCRIPTION OF THE DRAWINGS

FIG. 5A is a binary representation of a resync mark;

FIG. 5B is a digital signal representation of the resync mark;

FIGS. 5C and 5D are digital signals based upon the rising and falling transitions, respectively, of the resync mark of FIG. 5B;

FIG. 7 is a logic diagram of an implementation of a resync detection and realignment circuit of the present invention;

FIGS. 8A and 8B are a two-part logic diagram of a resync validation and correlation circuit of the present invention;

FIGS. 9A and 9B are logic diagrams of an unvalidated resync detection circuit of the present invention;

FIG. 14 is a logic diagram of a multiplexor of the present invention.

DETAILED DESCRIPTION OF THE INVENTION

Figure 1A:
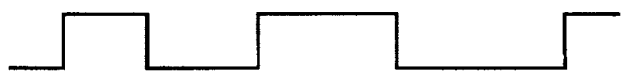
FIG. 1A is an exemplary PWM waveform having proper alignment.
Figure 1B:
FIG. 1B is an exemplary PWM waveform having alignment wherein marks are one binit too short.
Figure 1C:
FIG. 1C is an exemplary PWM waveform having alignment wherein marks are one binit too long.
Figure 2:
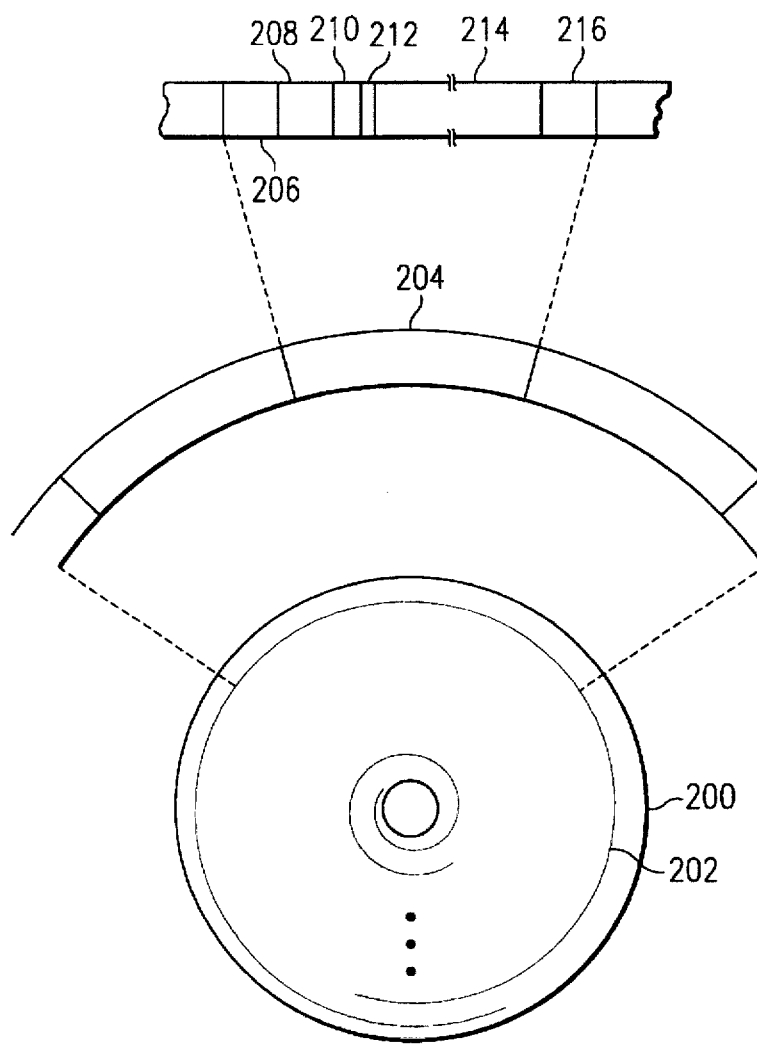
FIG. 2 is a schematic representation of an optical disk.

FIG. 2 is a schematic representation of an optical disk 200 having a continuous spiral track 202 extending between the inner and outer diameters of the disk 200. The track is divided into sectors, such as sector 204 which is shown enlarged. In one industry standard format, the sector 204 comprises a 63-byte preformatted header 206 (including an 8-byte sector mark), an 18-byte portion 208 for automatic laser power control and associated gaps, a 27-byte VFO area 210, a 4-byte sync mark 212, a user data area 214 having 1024 bytes of user data and 254 bytes of format information, including periodic resync marks, and a 20-byte buffer 216.

Figure 3:
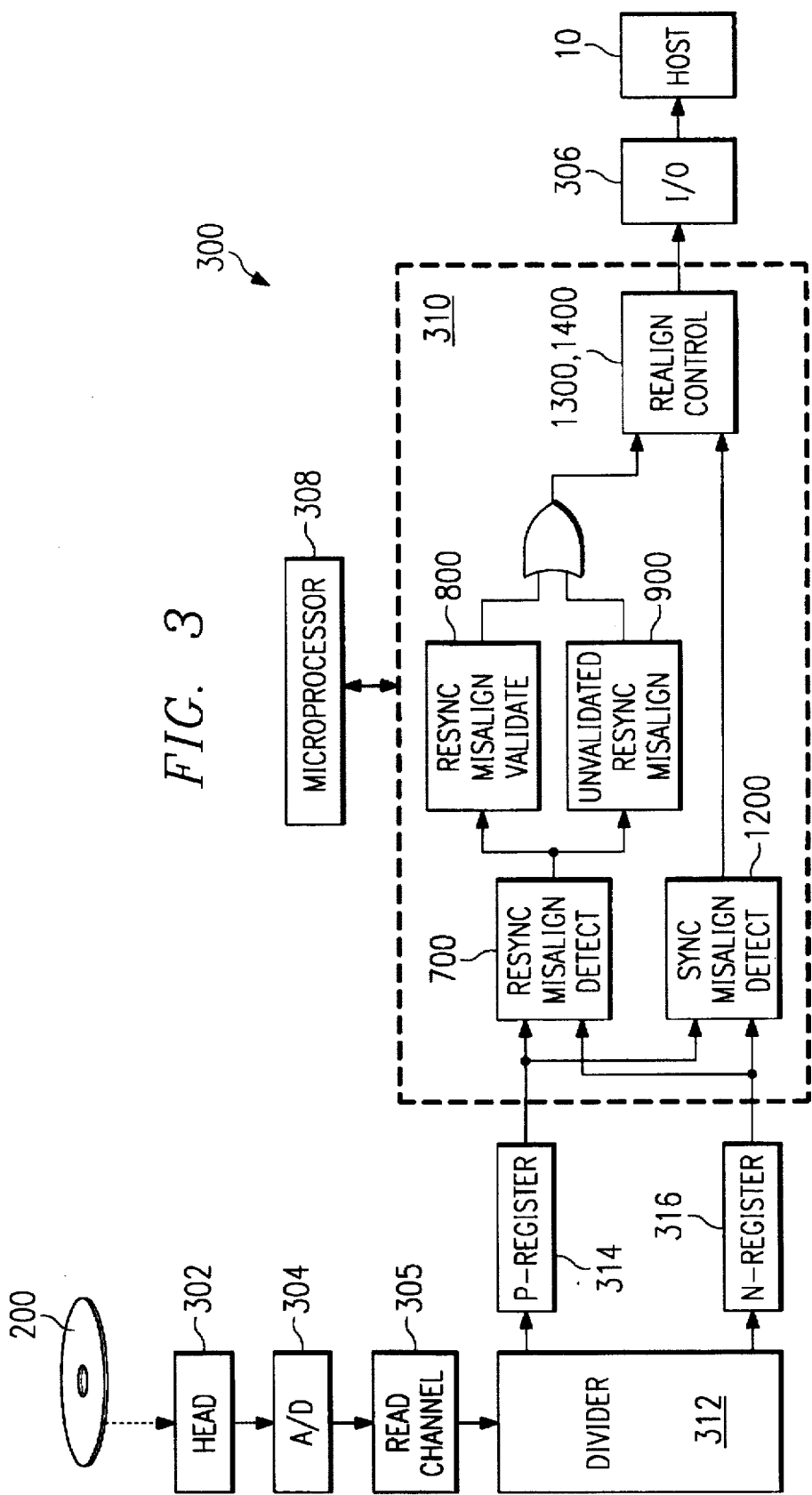
FIG. 3 is a block diagram of an optical drive unit of the present invention.

FIG. 3 is a block diagram of an optical drive unit 300 of the present invention which reads/writes data from/to an optical disk 200 and transmits/receives the data to/from a host device 10. The drive unit 300 includes an optical head 302 for directing a laser beam onto a surface of the disk 200 and detecting the light reflected from the surface, a converter 304 for converting the analog signal from the detector into a digital data stream representative of the data read back from the disk 200, a digital read channel, an input/output interface 306 through which data and commands are exchanged with the host 10 and a microprocessor 308 to control all aspects of the operation of the drive unit 300. The drive unit 300 further includes a data realignment module 310, a data divider 312 and positive and negative shift registers 314 and 316, respectively; the data realignment module 310 has a resync misalignment detector 700, validated resync misalignment module 800, an unvalidated resync misalignment module 900, a sync misalignment detector 1200 and a realignment controller 1300, 1400, all of which will be described in detail below. Modules 700 and 1200 are both connected to both of the registers 314 and 316 to permit proper misalignment detection and correction whether the alignment bit is represented by a positive transition or a negative transition. Although the present invention will be described in terms of the positive transitions being processed through the positive register 314 and the negative transitions being processed through the negative register 316, the present invention contemplates the opposite mode of processing as well.

Figure 4:
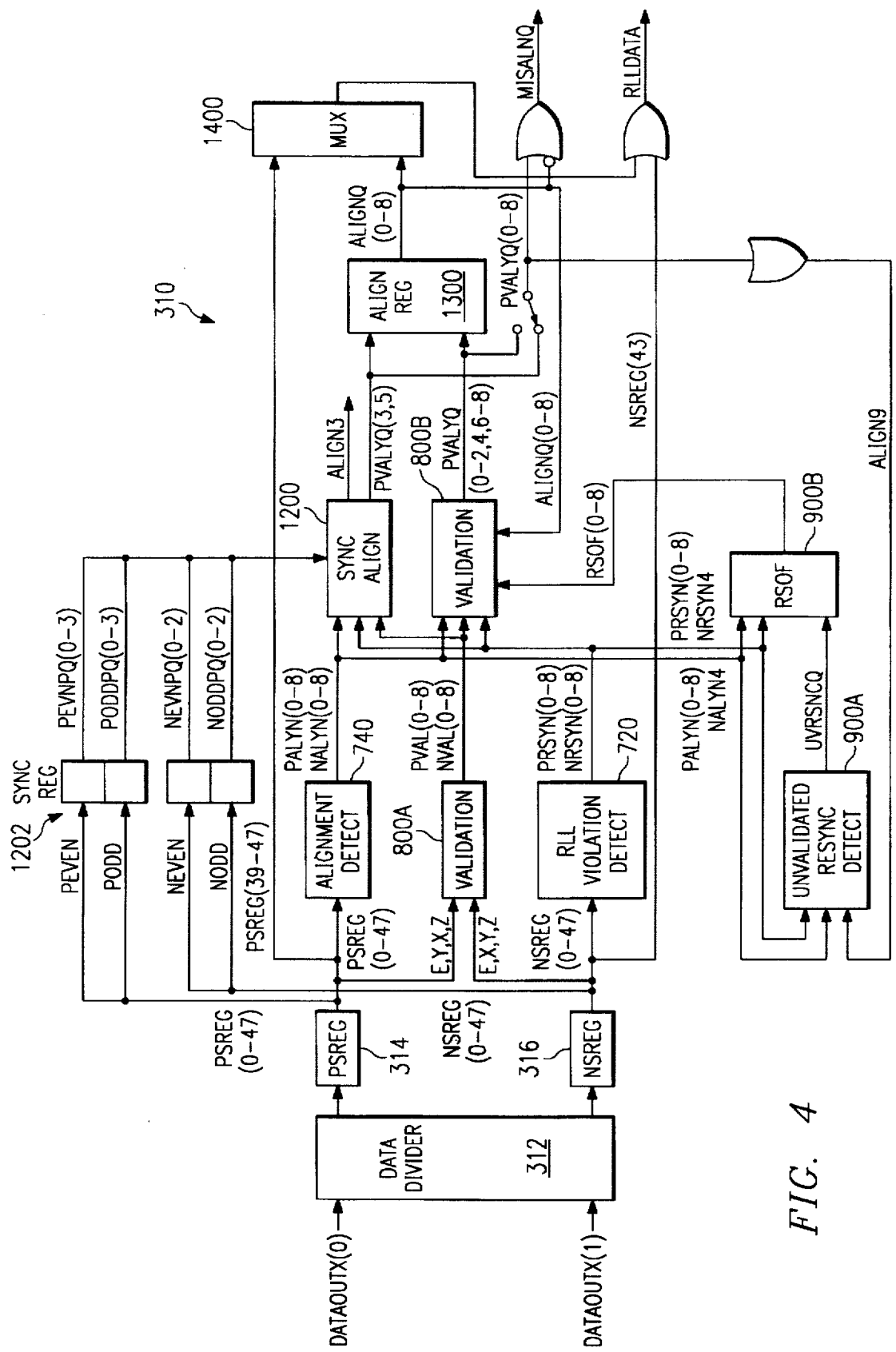
FIG. 4 is a more detailed block diagram of a data realignment module of the present invention.

The inputs DATAOUTX(0) and DATAOUTX(1) to the divider 312 are processed synchronous dynamic inputs from the A/D converter 304 containing the positive and negative transitions, respectively. In one embodiment, the positive and negative shift registers 314 and 316 each hold the last 32 bits of a feature, such as the 48-bit sync mark, while the first 16 bits are passed through the positive and negative shift registers 314 and 316, through an OR gate, then held in a third shift register (not shown). Alternatively, full 48-bit registers can be employed for both the positive and negative shift registers 314 and 316 (as illustrated in FIG. 4) without employing the third shift register. As is known, a clocking unit coordinates the flow of data through the shift registers 314 and 316.

FIG. 4 is a more detailed block diagram of the data realignment module 310. Its elements will be periodically referred to and explained below.

Realignment Based Upon Resync Mark

Figure 6:
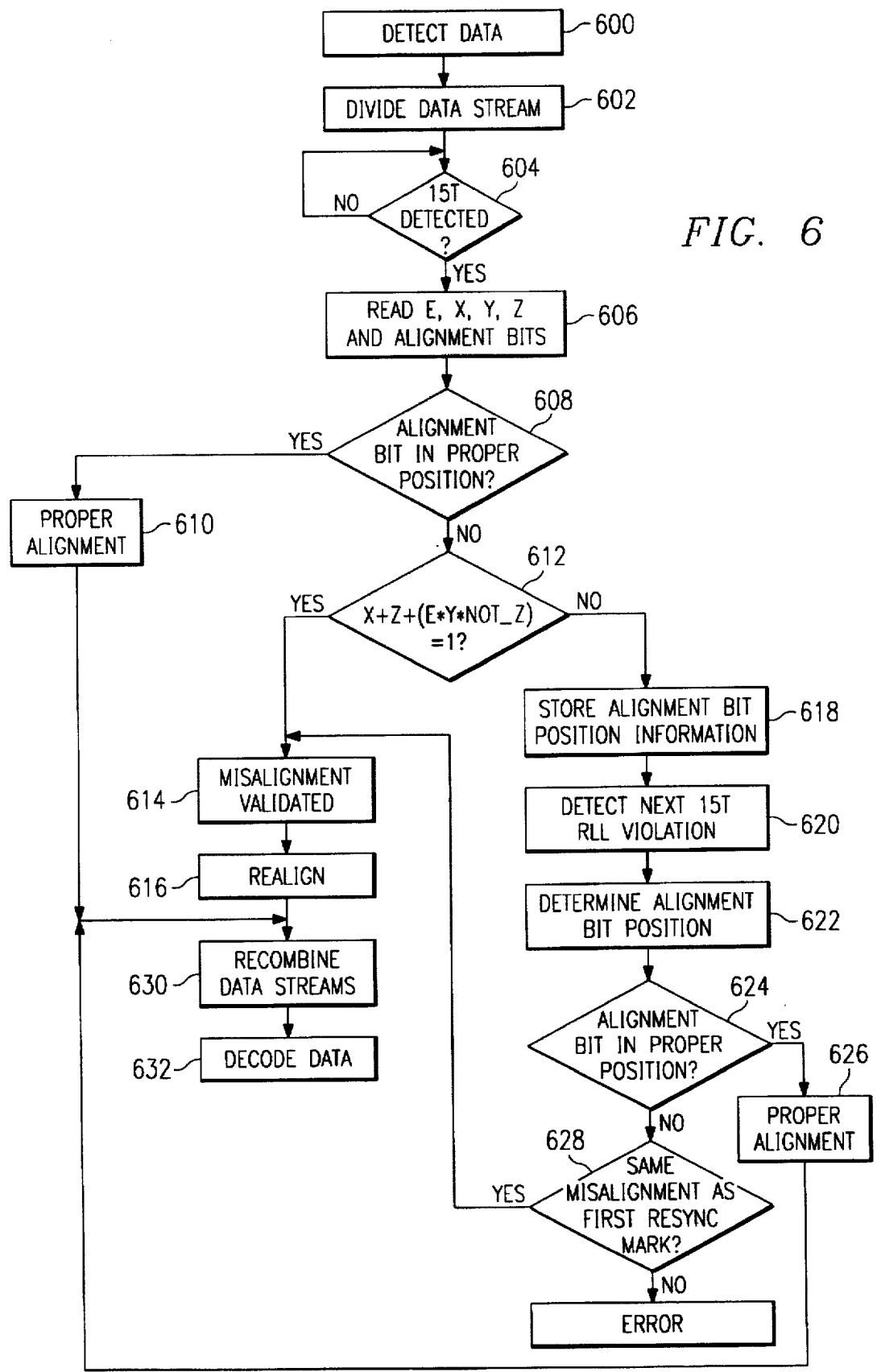
FIG. 6 is a flowchart of a method of realigning a data stream using the states of bits in a resync mark.

A first aspect of the present invention employs resync marks to realign the data stream while a second aspect employs sync marks to realign the data stream. Referring to the first aspect, an entire resync mark is shown in binary form in FIG. 5A and the central feature is shown in digital signal form in FIG. 5B. The central portion is an 8T mark followed by a 7T gap (or vise versa); that is, 1000000010000001. Both of these features separately comply with the (d, k) restraints of a Franczek (1, 7) run length limited (RLL) code; however, these RLL coding rules prohibit a 7T feature from following an 8T feature. Consequently, a resync mark can be detected by sensing an RLL violation of this nature. One method to accomplish such detection is to obtain a data stream from the optical disk (Step 600 in the flowchart of FIG. 6) and divide it into separate positive and negative data streams (Step 602). The data stream based upon rising transitions in the resync mark would appear as a 15T spacing between two rising transitions, shown in FIG. 5C. The 15T spacing can be sensed (Step 604) independently of read channel misalignments such as PFTD false lock or a momentary frequency error of the one PLL relative to the other PLL in a dual PLL configuration.

One means which can be used by the resync misalignment detector 700 to detect the 15T RLL violation is a resync mark detector 720 shown in FIG. 7 having a RLL violation-detection AND gate to receive 23 bits of one of the divided data streams of a resync mark (each of the inputs of the violation-detection AND gate which corresponds to the positions of bits which should be 0's in the data stream are inverted). When the violation-detection AND gate has detected a 15T feature, it outputs a 1 indicating an RLL code violation. The data stream based upon the opposite transition (which will be referred to herein as the "alignment bit") in the principal portion of the resync mark would appear as shown in FIG. 5D. This transition can be used to determine the proper alignment when the two data streams are recombined. A means which can be used to determine the position of the alignment bit is an alignment bit position detector 740 of FIG. 7 having an alignment-detection AND gate to receive the opposite data stream (again each of the inputs which corresponds to the positions of bits which should be 0's in the data stream are inverted; inputs corresponding to the E, X, Y and Z bits are ignored). When the alignment-detection AND gate has detected the position of the alignment bit, it outputs a 1 on data lines PALYN or NALYN.

The alignment bit position module 740 preferably comprises nine AND gates, each having a configuration similar to the alignment-detection AND gate but offset by one position from the adjacent AND gate such that the alignment bit is detectable at a different terminal of each AND gate. Thus, if the alignment-detection AND gate (shown in FIG. 7) outputs a 1 when the alignment bit is detected at the thirteenth terminal, one of the eight other AND gates would output a 1 when the alignment bit is detected at one of the terminals 9–12 or 14–17, respectively. The outputs of the AND gates are identified as PALYN(0–8) and the one active output indicates the position of the alignment bit. To permit resynchronizations of both polarities, an additional set of AND gates is arranged to detect the alignment bit in the negative data stream and output NALYN(0–8).

However, merely detecting the position of the alignment bit does not provide protection against significant defects; if the correction of a faulty realignment can occur based upon an edge (transition) which is misplaced due to a single bit defect, the false alignment would not be corrected until the next resync mark was detected. Moreover, a serious defect can interrupt the read channel to give a false lock condition and cause a continuous misalignment. The present invention provides a robust realignment scheme by using transition edges in the resync mark in addition to using the alignment bit and by constraining the relative realignment to occur only when detection of a resync mark misalignment is validated by an independent event.

Referring again to FIG. 5A, the 'X' and 'Y' bits are included in the full resync mark to provide continuity of the RLL code into and out of the resync mark, respectively; the 'Z' bit is included to provide minimization of the digital sum value of the data record when viewed as a whole (more detail is provided in Annex G of the Proposed ANSI standard X3B11/94-096 for "Information Interchange for 130 mm Optical Disk Cartridge Capacity: 26 Gigabytes per Cartridge"). The probability that at least one of the X, Y and Z bits is present (that is, a binary 1) is a function of the data encoded in the RLL form. Assuming a random data stream where the probabilities of an input bit being a binary 0 or a binary 1 are each equal to 50% and where there is no correlation between adjacent bits, the probability that minimization of the digital sum value will require Z to be present is also equal to 50%. For reasons which will not be detailed herein, the probabilities of X and Y being present are about 67% and 50%, respectively. Consequently, assuming that the X, Y and Z bits are independent of each other, the probability that at least one of the bits will be a binary 1 is about 92%. Further, because the Y bit is adjacent to user encoded data bits, if Y is 0, there is a 50% probability that the bit following Y will be a 1, and if that bit is not a 1, there is a 100% probability (a certainty) that the next bit will be a 1. Consequently, the potential exists for a false validation by the bits following the Y bit if the alignment bit has slipped by one or two bits.

In the present invention, the X, Y, Z and alignment bits are detected (Step 606) and a determination made whether the alignment bit is in the proper position (Step 608). If it is, there is no misalignment (Step 610). However, if the alignment bit is in out of its expected position, then if even one of the X, Y or Z bits is present at the same offset, the position of the alignment bit can be validated and realignment of the data stream to the indicated relative position is allowed. And, alignment verification with the Y bit via user data bits is a desirable method of reducing the risk of false realignment. Such method is provided by detecting the third bit before the X bit, referred to as the 'E' bit (Step 606). Under RLL constraints, E will be present if X is not. A requirement can, therefore, be imposed that both E and Y be present, thereby maintaining the 92% validation probability while using user data to reduce the possibility of false validation.

Given that Y will be the same as the alignment bit if Z=0, the validation condition required to realign the data stream based on the state of bits in a single resync mark can be represented logically by:

X OR Z OR (E AND Y AND NOT_Z )   Condition 1

If the given logic condition is met (Step 612), as determined by the validated resync misalignment modules 800A and 800B (FIG. 4, and shown in more detail in FIG. 8), the misalignment has been confirmed or validated (Step 614) and the two data streams can be realigned immediately (Step 616).

FIG. 8A is a block diagram of an exemplary portion of the logic used to generate the outputs PVAL(0–8) and NVAL (0–8) based upon all or a portion of the Condition 1 above when the offset is one or two positions.

The set of gates 802 at the top of FIG. 8A generates an output NVAL(4) representing the entire Condition 1 if the alignment bit is in the proper position at the middle of a 9-bit wide window. The set of gates 804 in the middle of FIG. 8A generates an output PVAL(0) if the alignment bit is offset by four bits in one direction and the set of gates 806 in the lower portion of FIG. 8A generates an output PVAL(1) if the alignment bit is offset by three bits in the same direction. Similar gate configurations are employed to generates outputs if the alignment bit is offset by one or two bits in the same direction (PVAL(3 & 2), respectively) or offset by one to four bits in the opposite direction (PVAL(5–8)). If a misalignment occurs in one direction, the Y-bit will not be contained in the register and it is not used as an input to the sets of logic gates 804 and 806. Similarly, if a misalignment occurs in the opposite direction, the E-bit will not be contained in the register and it is not used as an input to the appropriate logic gates.

The input STOPRSV is generated by the controller 308 and used to prevent the resync validation operation and subsequent realignment from occurring (STOPRSV=1) if a defect is present which has produced movement of two edges in a resync mark or has produced a totally false resync mark. Such an unlikely event can allow movement of both the alignment bit and a validation bit and can cause the data to be improperly realigned. All subsequent data would then be in error until another resync mark can be used for proper realignment.

FIG. 8B is a block diagram of the logic used to generate the outputs PVALYQ(0–2, 4, 6–8) and NVALYQ(0–2, 4, 6–8) from the corresponding PVAL and NVAL signals (PVALYQ(3 & 5) and NVALYQ(3 & 5) are generated by the sync mark alignment module 1200). Other inputs to the gates include PRSYN(0–2, 4, 6–8) from the resync mark detector 720, PALYN(0–2, 4, 6–8) from the alignment bit position module 740, ALIGNQ(0–2, 4, 6–8) from the alignment register 1300 and RSOF(0–8) from the unvalidated resync misalignment module 900B to provide realignment in the event that misalignment is not validated by the Condition 1.

Figure 9B:
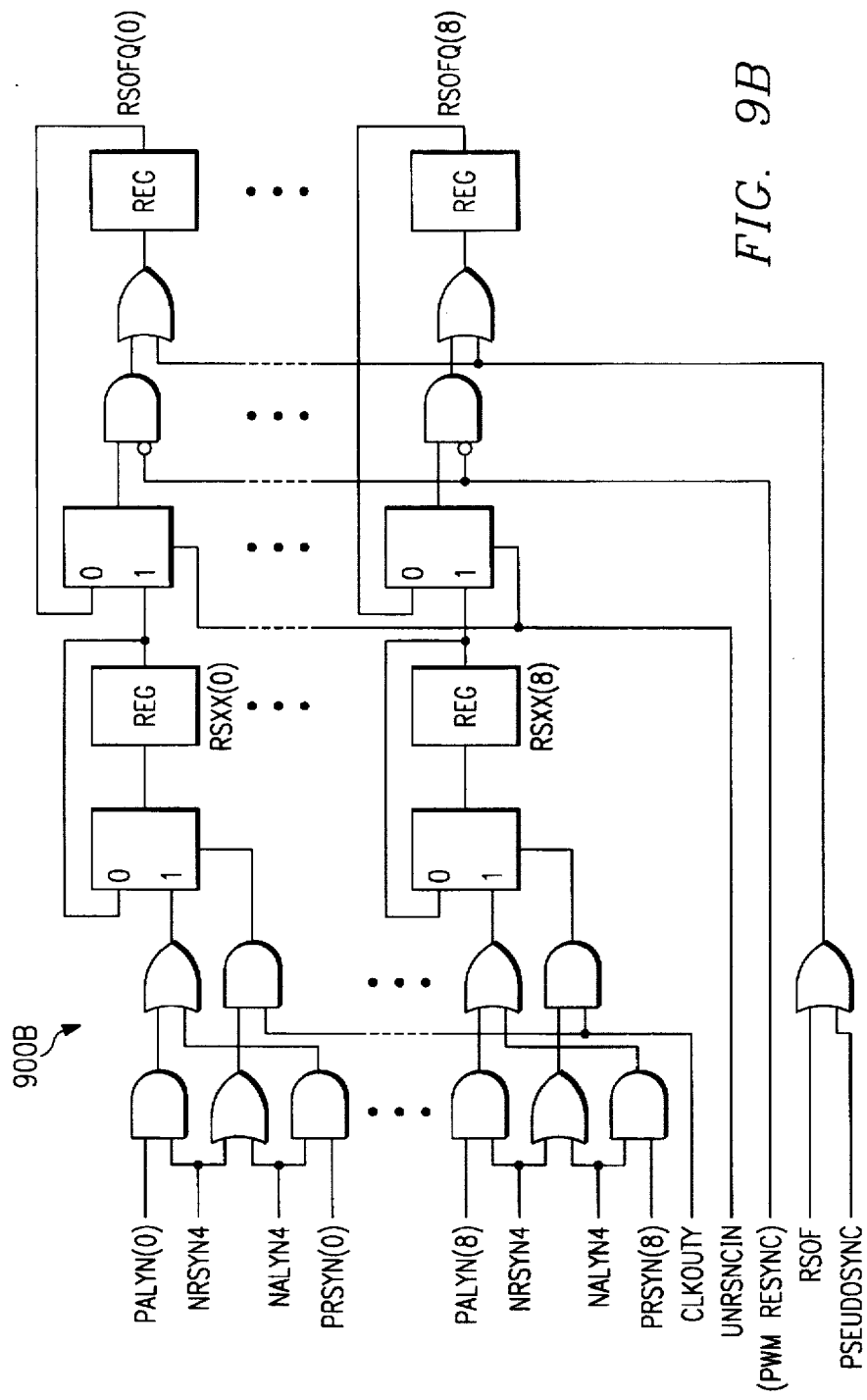

If the validation condition is not met based on the state of bits in a single resync mark (that is, if the states of all of the nine lines PVALYQ(0–8) remain unchanged and the state of line ALIGN9 (resulting from OR'ing the nine lines PVALYQ(0–8); FIG. 4) changes, the alignment information which was determined from the position of the alignment bit in the first resync mark is stored in a memory in the controller 308 (Step 618) and acted on only when validated by confirming the position of the alignment bit in the next resync mark (Steps 620–628). As illustrated by the logic diagrams of FIG. 9A, the outputs PALYN(0–8) from the alignment bit position module 740 are OR'd (and enabled by AND'ing with NRSYN4) and the outputs PRSYN(0–8) from the resync mark detector 720 are OR'd (and enabled by AND'ing with NALYN4). The outputs from these separate operations are themselves OR'd, then enabled by AND'ing with RYWINDW (which indicates that a resync event should occur within a predetermined time window). The result is enabled by AND'ing with NOT_ALIGN9 and the output UVRSNCQ is used to enable the logic of FIG. 9B which outputs the signals RSOF(0–8) to the validated resync misalignment module 800A when a misalignment is confirmed by misalignment in a second resync mark.

After the relative misalignment of the data streams has been determined, they can be realigned and combined (Step 630), as described below, and the data from the disk can be decoded (Step 632).

Realignment Based Upon Sync Mark

Figure 10:
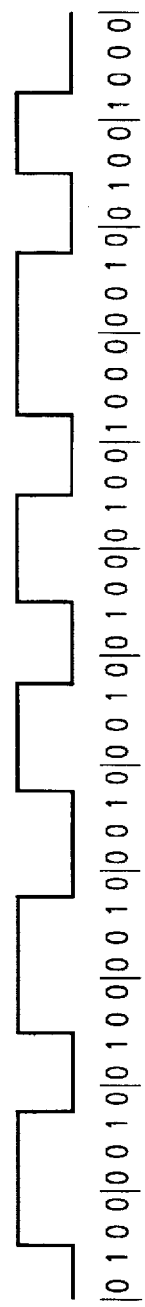
FIG. 10 is a schematic representation of a sync mark.

A second aspect of the present invention employs sync marks to realign the data stream. Referring now to the second aspect, FIG. 10 is representative of a 48-bit sync mark 26 in a properly formed sync mark, each of the 12 nibbles includes a single transition, representing a binary 1, in one of the four possible bit positions (although, in (1, 7) RLL code, the last nibble can have two transitions). Thus, there should be 6 positive transitions (rising edges) and 6 negative transitions (falling edges) in the sync mark 26. In the sync mark illustrated, the positive transitions are found in the even nibbles 0, 2, 4, . . . , and 10 while the negative transitions are found in the odd nibbles 1, 3, . . . , and 11. Due to miswritten or opposite polarity media and other factors, the positive transitions could be found in the odd nibbles and the negative transitions found in the even nibbles; the present invention takes both possibilities into account.

Figure 11:
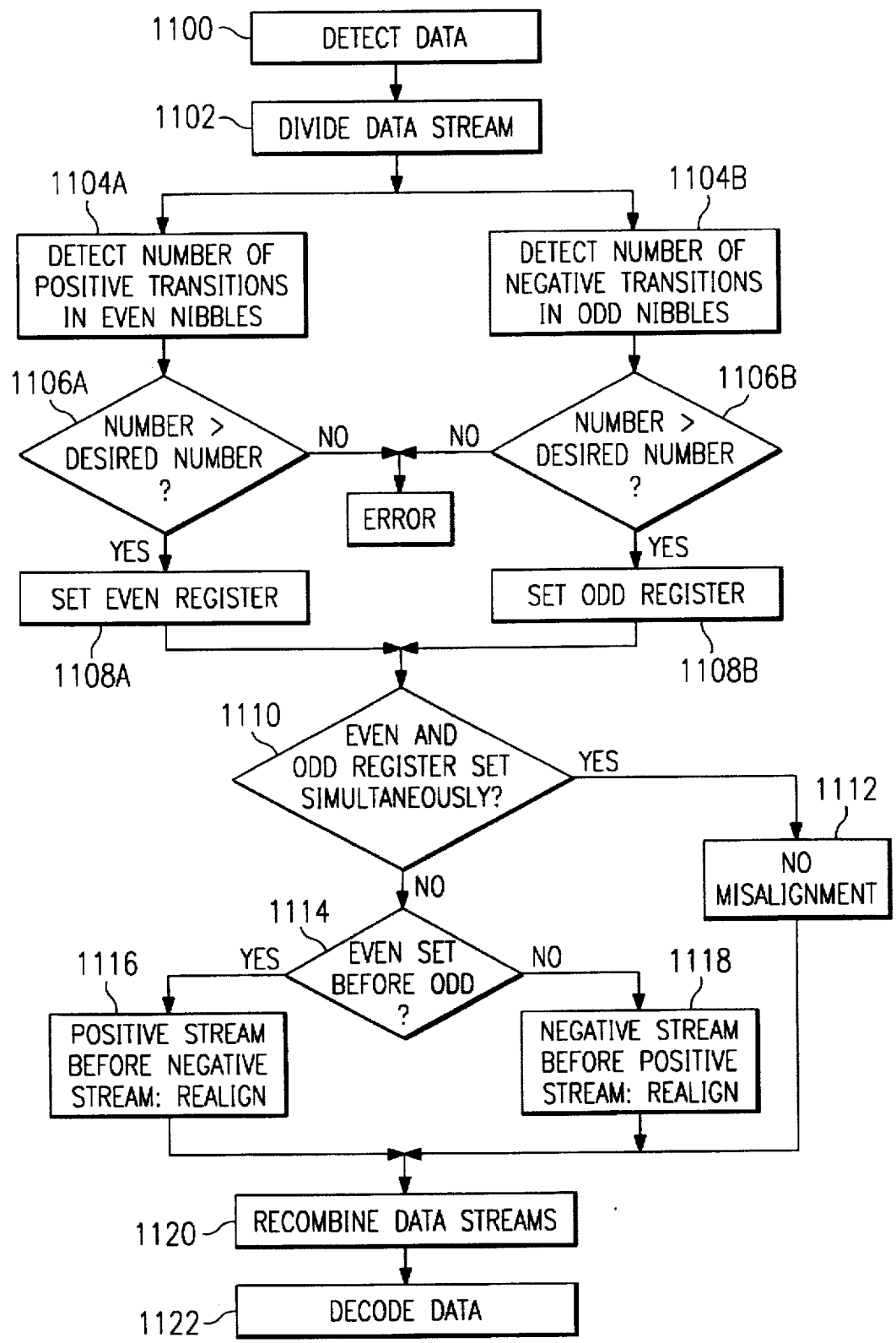
FIG. 11 is a flowchart of a method of realigning a data stream using the states of bits in a sync mark.
Figure 12:
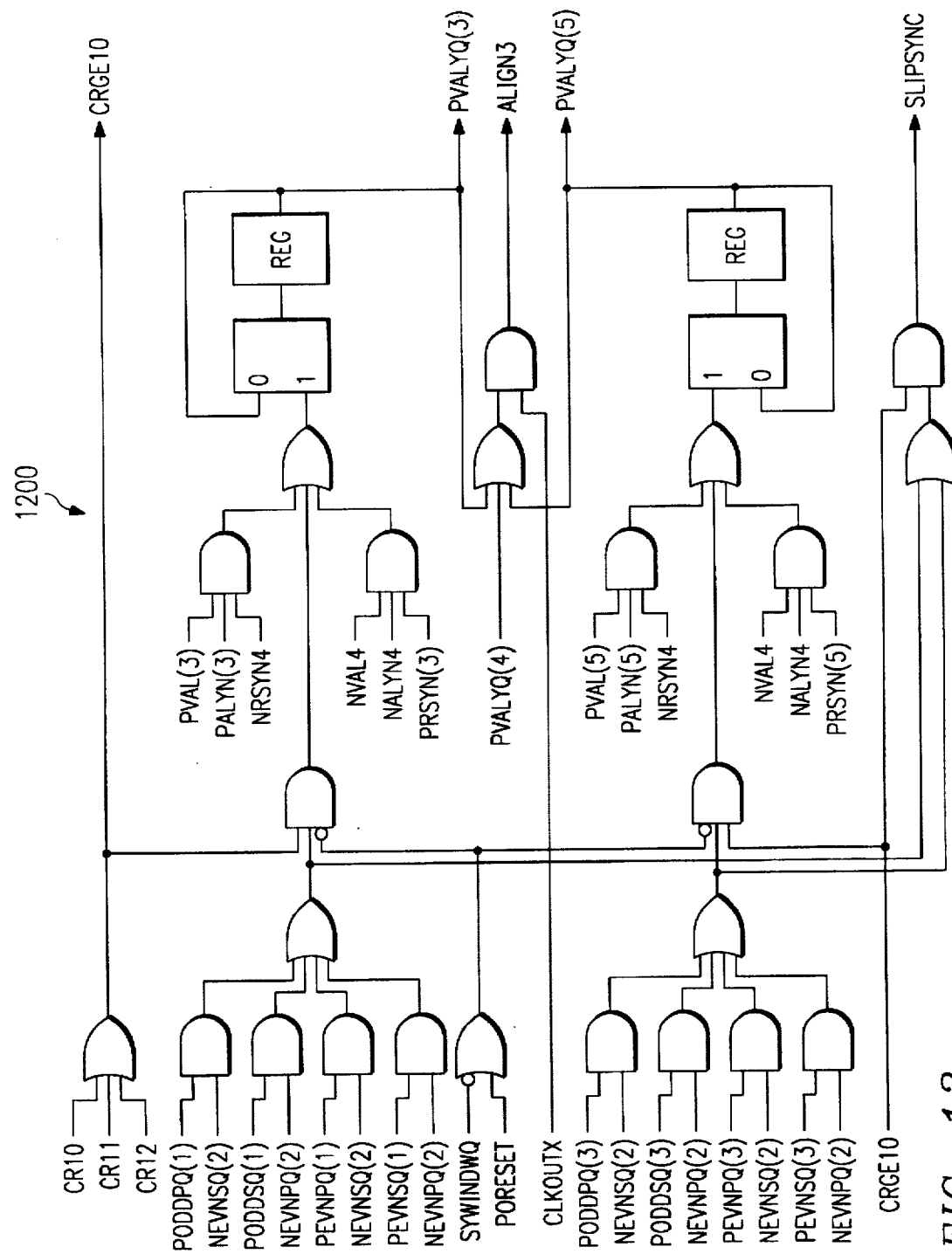
FIG. 12 is a logic diagram of an exemplary portion of a sync mark alignment detector of the present invention.

The flow chart of FIG. 11 illustrates the use of the sync mark in realigning the data stream. Data is detected (Step 1100) and divided into positive and negative streams (Step 1102). The 48-bit contents of both of the registers 314 and 316 are further divided into even and odd 4-bit nibbles and held in sync registers, collectively identified by reference numeral 1202 in FIG. 3. (The outputs of the positive sync registers are PEVNPQ(0–3) and PODDPQ(0–3), where PEVNPQ(1) and PODDPQ(1) have been once delayed, PEVNPQ(2) and PODDPQ(2) have been twice delayed and PEVNPQ(3) and PODDPQ(3) have been three time delayed relative to PEVNPQ(0) and PODDPQ(0). The outputs of the negative sync registers are NEVNPQ(0–2) and NODDPQ (0–2), with corresponding one and two cycle delays. Through the positive sync register, the positive data stream is examined for the presence of positive transitions in the even nibbles of the sync mark (Step 1104A) and through the negative data stream, the negative sync register is examined for the presence of negative transitions in the odd nibbles (Step 1104B). Next, it is determined whether the number of positive transitions detected in the even nibbles and the number of negative transitions detected in the odd nibbles exceed a predetermined number (Steps 1106A and 1106B). For example, the drive controller 308 may be programmed to acknowledge the presence of a proper sync mark when the transitions in at least 9 of the 12 nibbles are correct; that is, if there are at least 5 nibble-wide correlations on the positive data stream in the 6 even nibbles and at least 4 nibble-wide correlations on the negative data stream in the 6 odd nibbles (or, as one of several alternatives, 4 nibble-wide correlations on the positive data stream in the even nibbles and 5 nibble-wide correlations on the negative data stream in the odd nibbles). The present invention provides for the examination of each of the various positive and negative, even and odd combinations as shown in the logic of the sync alignment module 1200 detailed in FIG. 12. Those inputs with a "PQ" suffix represent primary inputs which transition to a "1" when 5 transitions of the appropriate polarity are detected; those inputs with an "SQ" suffix represent secondary inputs which transition to a "1" when 4 transitions of the appropriate polarity are detected. Thus, primary positive lines (PxxxPQ(x)) are paired with secondary negative lines (NxxxSQ(x)) for comparison by AND gates and primary negative (NxxxPQ(x)) lines are paired with secondary positive (PxxxSQ(x)) lines. Moreover, comparing the Nxxxxx (2) lines with the Pxxxxx(1 & 3) lines enables a one-bit misalignment in either direction to be detected.

Returning again to the flow chart of FIG. 11, if the minimum number of positive transitions is detected in the even nibbles of the sync mark, PEVNPQ(0) is set (Step 1108A); similarly, if the minimum number of negative transitions is detected in the odd nibbles of the sync mark, NODDPQ(0) is set (Step 1108B). If both registers are set simultaneously (Step 1110), then no misalignment has occurred (Step 1112), the data stream can be recombined (Step 1120) and the data decoded (Step 1122). If, however, the PEVNPQ(0) and NODDSQ(0) are not set simultaneously (Step 1114), then a misalignment has been detected and is corrected (Steps 1116 or 1118). In the next cycle, the contents of each of the sync registers 1202 will shift one place and the contents of the positive and negative registers 314 and 316 are shifted four places. It is again determined whether the minimum number of positive and negative transitions are detected (in any register); if so, the appropriate register outputs are set. For example, if PODDPQ(1) occurs simultaneously with NEVNSQ(2), the positive data stream is determined to be behind the negative data stream by one clock cycle. Similarly, if PODDPQ(3) occurs simultaneously with NEVNPQ(2), the positive data stream is determined to be ahead of the negative data stream by one clock cycle. After the misalignment has been determined and the necessary realignment has been made (Steps 1116 or 1118), the two data streams are recombined (Step 1120) and the data decoded (Step 1122).

Realignment of Data Streams

Figure 13:
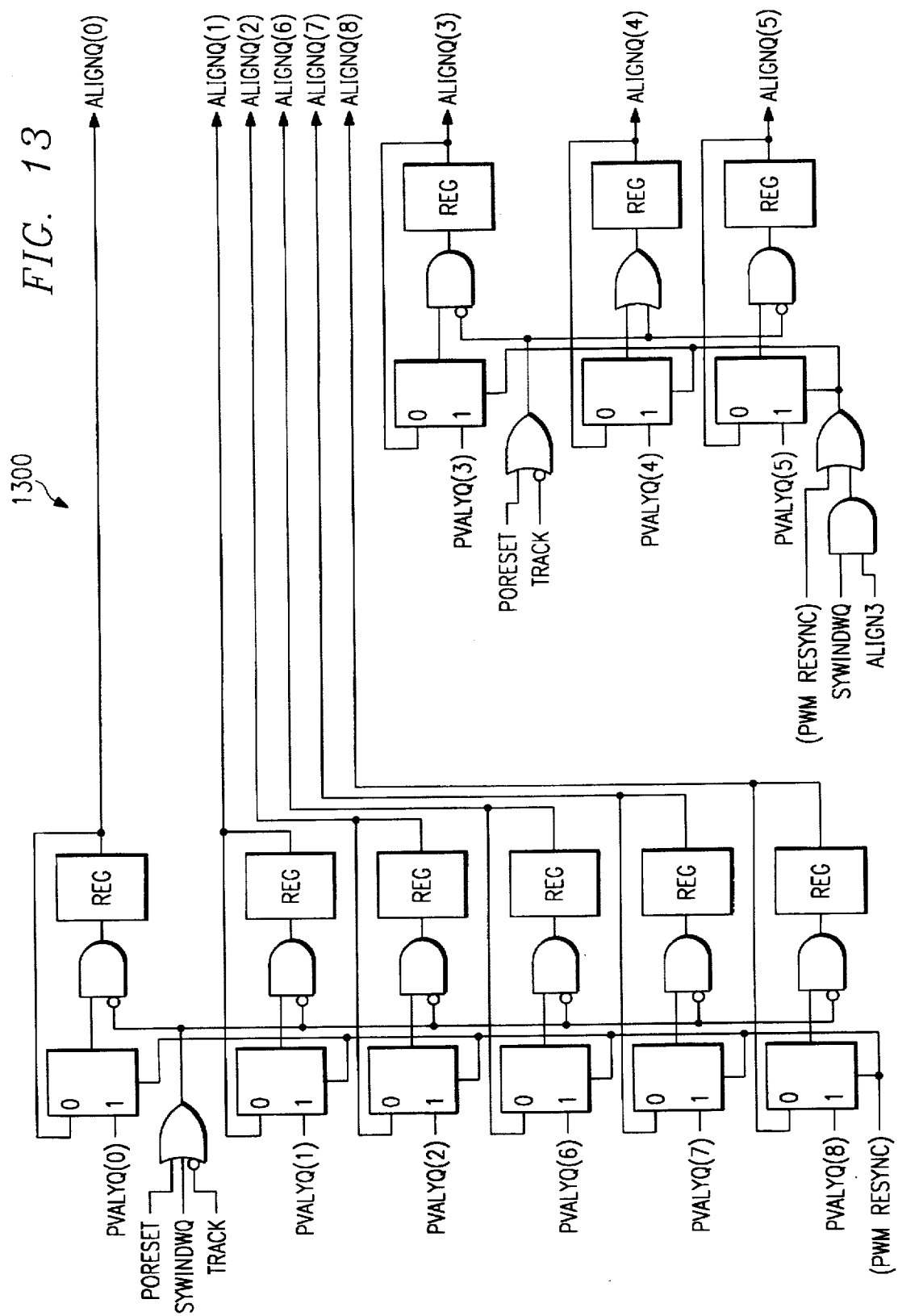
FIG. 13 is a logic diagram of an alignment register of the present invention.

After a misalignment has been detected by either the resync misalignment module 800B or the sync misalignment module 1200, realignment and recombination of the data streams can be performed. The alignment register 1300 (FIG. 13) receives inputs from both the sync misalignment module 1200 and the resync validation module 800B and, based upon the states of the input lines PVALYQ(0–8), outputs a select signal on output line ALIGNQ(0–8) to the multiplexor 1400 (FIG. 14). Each of the ALIGNQ lines is AND'ed with one of the PSREG(39–47) outputs and the outputs from all AND gates are OR'd together. The output from the OR gate is, in turn, OR'd with NSREG(43), thereby recombining the positive and negative data streams into the single, properly aligned output RLLDATA.

While the invention has been particularly shown and described with reference to preferred embodiments thereof, it will be understood by those skilled in the art that various changes in form and details may be made therein without departing from the spirit and scope of the invention.

What is claimed is:

1. A channel for use in the detection of a PWM coded input data stream having first transitions from a first state to a second state and second transitions from the second state to the first state, both first and second transitions being representative of a first binary state of data represented by the input data stream, the portions of the input data stream between consecutive first and second transitions being representative of a second binary state of the data, the input data stream further having an m-bit sync mark and a plurality of n-bit resync marks, each resync mark having an alignment bit, the channel comprising:

a data divider coupled to receive the input data stream and having a first output indicative of the passage of first transitions in the input data stream and a second output indicative of the passage of second transitions in the input data stream;

first and second p-bit registers coupled to receive the first and second outputs, respectively, of said data divider, $p \geq m,n$, each of said first and second p-bit registers having a plurality of outputs;

a resync mark misalignment detector coupled to q-outputs of each of said first and second registers, $q<p$, said resync mark misalignment detector for indicating a misalignment of the alignment bit relative to other bits in a first resync mark in the input data stream;

a validation network coupled to receive r-bits from said first register and outputs from said resync mark misalignment detector, said validation network for confirming the misalignment of the alignment bit in the first resync mark, $r<p$;

a sync mark misalignment detector coupled to p-outputs of each of said first and second registers for indicating a misalignment of one or more bits relative to other bits in a sync mark in the input data stream; and a realignment controller responsive to said validation network and said sync mark misalignment detector for generating an aligned output data stream.

2. The data channel of claim 1, wherein said resync mark misalignment detector comprises:

a first logic module coupled to q-outputs of said first register and operable to generate a resync detection signal upon detection of a predefined RLL violation in the input data stream indicative of the passage of a resync mark in the input data stream; and a second logic module coupled to q-outputs of said second register and operable to generate a resync misalignment signal indicative of the position of the alignment bit relative to other bits in the first resync mark.

3. The data channel of claim 2, wherein said validation network comprises:

a third logic module for detecting the state of predefined r-bits within the first resync mark; and a memory module for storing the relative position of the alignment bit if the relative position of the first alignment bit is determined by said second and third logic modules to be offset from a predetermined position;

said realignment controller comprising a comparator for comparing the relative position of the alignment bit stored in said memory module with the relative position of the alignment bit of a second resync mark in the input data stream to determine if the relative position of the stored alignment bit corresponds with the relative position of the alignment bit of the second resync mark, thereby confirming the misalignment of the alignment bit of the first resync mark.

4. The data channel of claim 2, wherein:

each properly aligned resync mark in the input data stream includes E, X, Y and Z bits at predetermined positions; and said validation network comprises a third logic module for determining $X+Z+(E*Y*NOT\_Z)$.

5. The data channel of claim 1, wherein a properly aligned sync mark includes t-nibbles, each nibble having a single transition in a predetermined position, first transitions occurring in even nibbles and second transitions occurring in odd nibbles, said sync mark misalignment detector comprising:

a first detector coupled to said first register for determining the number of first transitions in a sync mark;

a first comparator for determining whether, at a predetermined time, the number of first nibble-wide correlations in the sync mark at least equals u, u being less than or equal to the number of even nibbles in the properly aligned sync mark;

a second detector coupled to said second register for determining the number of second transitions in the sync mark;

a second comparator for determining whether, at the predetermined time, the number of second nibble-wide correlations in the sync mark at least equals v, v being less than or equal to the number of odd nibbles in the properly aligned sync mark; and a logic module coupled to said first and second comparators for generating an aligned-sync signal if the number of first nibble-wide correlations in the sync mark at least equals u and the number of second nibble-wide correlations in the sync mark at least equals v at the predetermined time, and for generating a misaligned-sync signal if the number of first nibble-wide correlations in the sync mark is less than u and the number of second nibble-wide correlations in the sync mark is less than v at the predetermined time, the misaligned-sync signal further indicating when, relative to the predetermined time, the number of first nibble-wide correlations in the sync mark at least equals u and the when, relative to the predetermined time, number of second nibble-wide correlations in the sync mark at least equals v.

6. The data channel of claim 1, wherein said realignment controller comprises:

a multiplexer for selecting one of the plurality of outputs of said first register; and an OR gate having a first input coupled to receive an output from said multiplexer and a second input coupled to receive a predetermined output from said second register whereby an output of said OR gate comprises the aligned output data stream.

* * * * *